May 4, 1937. J. L. SHRODE 2,079,579
VALVE FOR A REFRIGERATION SYSTEM
Filed June 13, 1935

Inventor
JOHN L. SHRODE
By: Ben V. Zillman
Attorney

Patented May 4, 1937

2,079,579

UNITED STATES PATENT OFFICE 2,079,579

VALVE FOR A REFRIGERATION SYSTEM

John L. Shrode, Maplewood, Mo., assignor to Alco Valve Co., Inc., Maplewood, Mo., a corporation of Missouri Application June 13, 1935, Serial No. 26,413

6 Claims. (Cl. 236—92)

This invention relates to improvements in valves and more particularly to such valves acting as distributors for controlling the flow of the refrigerant in the system to the point where needed, as the demand varies from time to time, and has among its objects the production of such a valve that is neat and attractive in appearance, of minimum size commensurate with the required strength and durability, readily responsive to fluctuations in load demand, and which will be otherwise satisfactory and efficient for use wherever deemed applicable.

One of the principal objects of my invention is to provide a valve of the kind described, in which a pressure-responsive diaphragm is used, the securement of the diaphragm being such that when assembled, and then sealed in place, all of the tension exerted on said diaphragm and flexing of the same, will be away from and beyond the line of such sealing, and consequently the seal will remain unbroken for the maximum period of service.

Another object of the invention is to provide a pressure plate in operative combination with the pressure-responsive diaphragm, and which shall remain in its centered position relative to said diaphragm without the aid of guides or the like, this permanent centering being obtained through deforming the diaphragm over one face of the pressure plate by initially and artificially increasing the pressure of said diaphragm against said plate prior to placing the valve into actual service in the line or system.

A further object of my invention is to provide a ball and socket connection between the valve and pressure plate and between the valve and pressure spring, whereby any irregularities in centering or alignment will be minimized or obviated and the pressure will be transmitted and centered in the intended manner, thus preventing faulty and improper operation due to improper centering of the forces controlling the operation of the valve.

An added object of the invention is to provide a valve of the kind described, in which the pressure acting on the valve to keep it closed, may be adjusted as required, without removing the element of the valve connected to the line and without change to the power element assembly.

A further object of my invention is to provide a distributor valve for a refrigeration system, in which the spring holding the valve seated is so mounted that it is entirely to one side of and beyond said seat and hence will pull the valve into seated position instead of causing any side thrust thereon.

A still further object of my invention is to so construct the various cooperating elements of the valve that the flange element will have the inlet and outlet openings therein for connection to the high and low pressure sides of the system, and the remaining structure removably mounted thereon so as to be removable as a unit without disturbing the connection between the flange and the line.

Many other objects and advantages of the construction herein shown and described will be obvious to those skilled in the art to which this invention appertains, from the disclosures herein given.

To this end my invention consists in the novel construction, arrangement and combination of parts herein shown and described, and the method used in assembling the same, as will be more particularly pointed out in the claims.

In the drawing, wherein like reference characters indicate like or corresponding parts throughout the views, Figure 1 is an elevation of one form of assembly or system, using the improved valve in the same;

Figure 1:
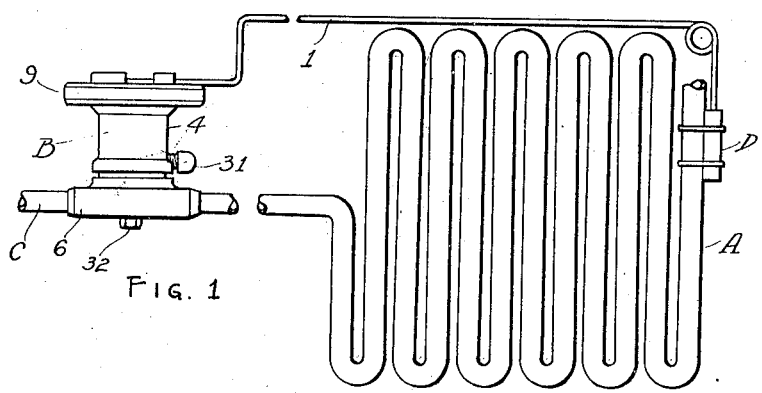
Figure 2:
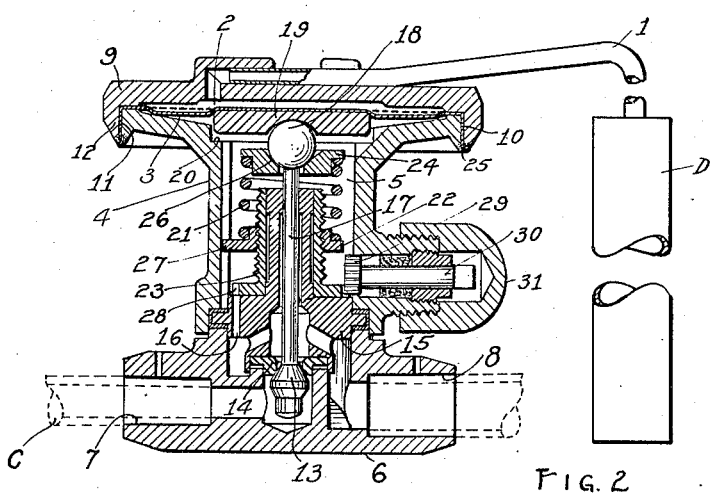
Figure 2 is a vertical cross-sectional view through the valve assembly.
Figure 3:
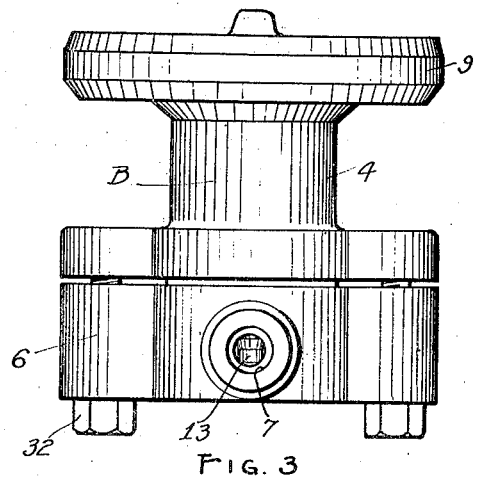
Figure 3 is a side elevation of the same.

Referring more particularly to the drawing, wherein I have illustrated a preferred embodiment of my invention, A indicates a refrigerating chamber, fixture or room, located at any desired point, this being termed the low pressure side of the system or line and receiving its refrigerant supply through the distributor valve B, the latter in turn having an intake opening for communication with the source of high-pressure refrigerant coming through the line C, any desired type or form of refrigerant being used in this system, such as freon, sulphur dioxide, methyl chloride, ammonia, or the like.

The valve B is intended to automatically regulate the flow of liquid refrigerant to the evaporating coil A in accordance with the refrigeration load that may exist at any time in the latter, and this is quite closely regulated by the use of a superheat-controlled bulb D one end of which is in thermal contact with the evaporator coil, preferably as the latter leaves the refrigerator, and has its other end extended through piping I communicating with the upper chamber or compartment 2 of the distributor valve, the bottom of said chamber having a flexible diaphragm 3 thereacross. This bulb is charged with an expansible refrigerant, so that the superheat of the refrigerant as it leaves the evaporator will expand the refrigerant in the bulb, this superheat being the additional heat absorbed by the refrigerant in the evaporator when its temperature becomes warmer than that corresponding to the pressure at evaporation. This superheat is made use of to control the flow of the refrigerant through the distributor valve, as will be more clearly hereinafter described.

A body member or casing 4, having an opening therethrough is arranged to cooperate with said pressure chamber 2, its pressure chamber 5 being opposed to the fluid pressure chamber 2 and having the diaphragm 3 as its top closure wall. A flange element 6 is arranged at the bottom of the element 4 and has a pair of openings 7 and 8 therethrough for connection to the high and low pressure sides or lines of the system, as shown, the piping of the lines being sweated or otherwise substantially permanently secured to the flange to insure against leakage during service, this sweating operation being done while the other parts of the assembled structure are temporarily removed from the flange, this detachability being as a unit and without disturbing any of the other parts than the flange, as will be hereinafter set forth.

The top element 9, receiving the conduit 1 and in which the chamber 2 is formed, cooperates with the body element 4 to hold the diaphragm in operative position, each of said parts having an annular area, one opposed to the other and between which the marginal area of the diaphragm is tightly clamped as shown. A flange 10 is provided on the periphery of said diaphragm, extending at an angle to the main body of the diaphragm, as by bending downwardly, and this is gripped between inner and outer flanged portions 11 and 12 respectively, and the free edge of the diaphragm flange is sealed hermetically to the adjacent areas of the portions 11 and 12, as by welding or the like. It is extremely essential to efficient operation that this seal be held indefinitely, and it has been found that in this construction all of the tension caused by flexing of the diaphragm through the action of fluid pressure thereon will be localized entirely away from and beyond the point of sealing. This upsetting or flanging of the diaphragm and the tight engagement of the diaphragm at its marginal area as well as at its flange will cause all of the tension or stress to be absorbed through such clamping and snubbing action, and the metal fusion need act only as a seal and not to provide an anchor against pulling action. Thus, all of the stress or tension is absorbed within the point or marginal area of weld.

Arranged within the casing 4 is a valve proper 13, seating against a preferably detachable disk or seat 14 held between the flange element 6 and a bottom closure plate 15, which in turn is clamped between the bottom end of the casing element 4 and the flange member 6, the latter being detachably secured to the casing by bolts 32 or the like, the element 15 having an opening therethrough communicating with the low pressure outlet opening 8 and with the valve seat or opening 14, so that the pressure or refrigerant may flow from the high pressure side to the low pressure side, through said opening in the element 15 when the valve is unseated. A vent 16 is provided through the element 15 to provide communication between the low pressure side of the line and the chamber 5.

The valve extends upwardly and the stem 17 of the same is provided with a ball 18 at its upper end, which in turn bears in a concave recess in the under side of a pressure plate 19 engaging the under side of the diaphragm. It is to be noted at this time that the pressure plate 19 has but a limited downward movement, the same abutting against a shoulder 20 in the upper end of the casing 4 at said limit of downward travel.

A spring 21 is interposed in the valve to assist in holding the valve on its seat, and if desired said spring may be adjusted to vary its pull on the valve, so that more or less superheat, as the case may be, will control the unseating movement of said valve. The lower end of said spring may bear on an arm 22 having threaded engagement on a sleeve element 23 rotatably mounted on the projecting hub of the element 15, while the upper end of said spring engages a thrust plate 24 having a spherical recess 26 to engage with and receive the under side of the ball 18. To prevent rotational movement of the element 22, the same may have a keyed engagement with the side wall of the casing or housing 4, as at 27, and thus when the element is rotated the arm 22 will be moved longitudinally or axially in the casing.

The spring may be adjusted by detaching the power element and casing from the flange 6, affording access for adjustment at that time, and without any dropping out or loss of the various parts, inasmuch as it is obvious that the pull of said spring will hold the various elements in their desired relationship within the casing when the flange 6 is separated from the rest of the assembled structure. Or, if preferred, the spring adjustment may be made wholly without disassembling of the device, by providing teeth 28 on the element 23 radially beyond the path of travel of the arm 22, to mesh with a pinion 29 having a stub shaft or stem 30 for engagement by some suitable tool for adjustment. A cap or cover 31 may be normally kept over the outer end of the shaft 30 to more effectively prevent loss of refrigerant through leakage, and to avoid excess dirt getting into the valve from without. It is apparent that when the shaft 30 is turned, by a wrench or the like, its pinion meshing with the teeth on the element 23 will rotate the latter and in turn actuate the arm 22 vertically to the desired adjusted position.

The ball and socket connections between the valve stem and the pressure plate and between the valve stem and the thrust plate 24 will permit slight mis-alignments or deformations during valve operation, without interfering with efficient operation of the device, as it is apparent that the center of pressure of the spring acting on the spherical head of the stem, through the plate 24 tends to center the valve in its seat and to accommodate the center of pressure of the diaphragm. The use of these universal connections will insure a long and useful life to the mechanism by preventing binding of parts, side thrust, and excess friction.

It is to be further noted that the spring, thrust plate 24, ball end 18, and pressure plate 19, are entirely to one side and beyond the seating portion of the valve and hence the valve is held seated with a pull or tension instead of a push. This pulling of the valve into seated position permits of all of the forces being in tension and maintaining an alignment of said forces instead of permitting the introduction of horizontal components of force, the universal connections further assisting in this perfect alignment and building up of forces.

In order to maintain the pressure plate correctly centered within the casing without the use of extra guides or the like, I prefer to deform the diaphragm to the exact shape of said plate, as will now be described. The parts of the power element, and if desired the other elements as well, are assembled as shown, the diaphragm extending substantially in a plane across the device. The pressure plate is centered in the exact center of pressure of the diaphragm, the power element charged and then subjected to an elevated temperature for a time. The predetermined elevation in temperature naturally results in an increased pressure within the power element, causing the diaphragm to push the plate against the casing shoulder to limit further movement of the plate, and pushing the metal of the diaphragm between the periphery of the plate and the clamped marginal area of the diaphragm a slight distance downwardly past the top of the plate, as indicated in the full-line representation of the diaphragm thereat, and leaving a permanent deformation in the material of said diaphragm. Hence, each diaphragm is individually stretched or deformed over its cooperating pressure plate.

The assembly permits of a minimum overall height of the device, thus adding to its neat appearance as well as to its effectiveness in service. The device may be considered to be composed of three main units, namely, the power assembly, the valve assembly, and the flange, and the complete assembly is held together by the cap screws between the flange and casing. The entire unit above the flange may be removed from the latter without disturbing the connection of the flange with the lines and without change to the power unit. The valve proper, valve seat, and spring assembly is entirely separate from the casing and from the flange so as to permit of simple and ready removal for inspection or the like. In assembling the device in the system the flange may be secured to the lines apart from the remaining structure of the device, thus confining the heat of sweating or the like to the flange itself and not to the other parts of the valve assembly, as well as permitting of more room and easier handling of the flange and lines during such securement. This ease and increased efficiency of securement of the flanges in place in the line is not only had in the original installation, but in the event of any changes or repairs to the line.

Having thus described my invention, it is obvious that various immaterial modifications may be made in the same without departing from the spirit of my invention; hence I do not wish to be understood as limiting myself to the exact form, arrangement, construction and combination of parts herein shown and described, except as limited by the state of the art to which this invention appertains and the claims hereunto appended.

What I claim as new and desire to secure by Letters Patent is:

1. The method of permanently centering a pressure plate of a valve against a diaphragm, consisting of securing said diaphragm adjacent its edge in said valve, with said pressure plate temporarily centered against one face of said diaphragm, and then subjecting the diaphragm to sufficient fluid pressure on its other face to permanently partially deform the same onto said plate.

2. The method of permanently centering the pressure plate of a power element of a refrigerant distributor against a diaphragm, consisting of fixedly securing said diaphragm in place at its marginal area, centering said plate against one face of said diaphragm, and then subjecting the other face of the diaphragm to sufficient fluid pressure to permanently partially deform the diaphragm onto said plate.

3. In a refrigerant distributor control, a valve body, a diaphragm dividing the same into a pair of opposed pressure chambers, a pressure plate movable in one of said chambers and engaging said diaphragm, a valve stem having a ball and socket engagement with said plate, a spring guide element cooperating with said stem and having a ball and socket engagement therewith, and a spring interposed between said guide element and valve body to force said guide element and pressure plate yieldingly toward said diaphragm.

4. In a refrigerant distributor, a valve body having an inlet and on outlet opening therein, a diaphragm dividing said body into a pair of fluid pressure chambers, a valve seating in said body and controlling passage between said inlet and outlet, a valve stem extending from said valve and having a ball end, a pressure plate movable in said body to engage with said diaphragm and having a recess to receive said ball end of the stem, a spring guide element on said stem and having a recess to receive said ball end, and a spring interposed between said valve body and said guide element to one side of said valve seat to pull said valve into seated position.

5. In a refrigerant distributor, a valve body having high and low pressure openings, a diaphragm secured at its edges to said body and dividing said body into a pair of fluid pressure chambers, a valve seating in said body and controlling passage between said openings and actuated by said diaphragm, a pressure plate movable in said body to engage said diaphragm, a valve stem extending from said valve and having a ball and socket connection with said plate, and a spring engaging said stem and body entirely to one side of said valve seat to pull the valve into seated position.

6. In a refrigerant distributor, a valve body having an inlet and an outlet, a casing detachably connected to said body, a flexible diaphragm dividing said casing into opposed pressure chambers, one of said chambers communicating freely with said outlet, a plate provided with an aperture formed as a valve seat controlling communication between said inlet and the last named chamber, a valve on the inlet side of said plate and having a stem extending through said aperture into contact with said diaphragm, and yielding means concentric with and cooperating with said stem to hold said valve normally in closed position on said seat and with the end of said stem in operative contact with said diaphragm and gear means for varying the pressure of said yielding means on said stem.

JOHN L. SHRODE.